Figure 1:
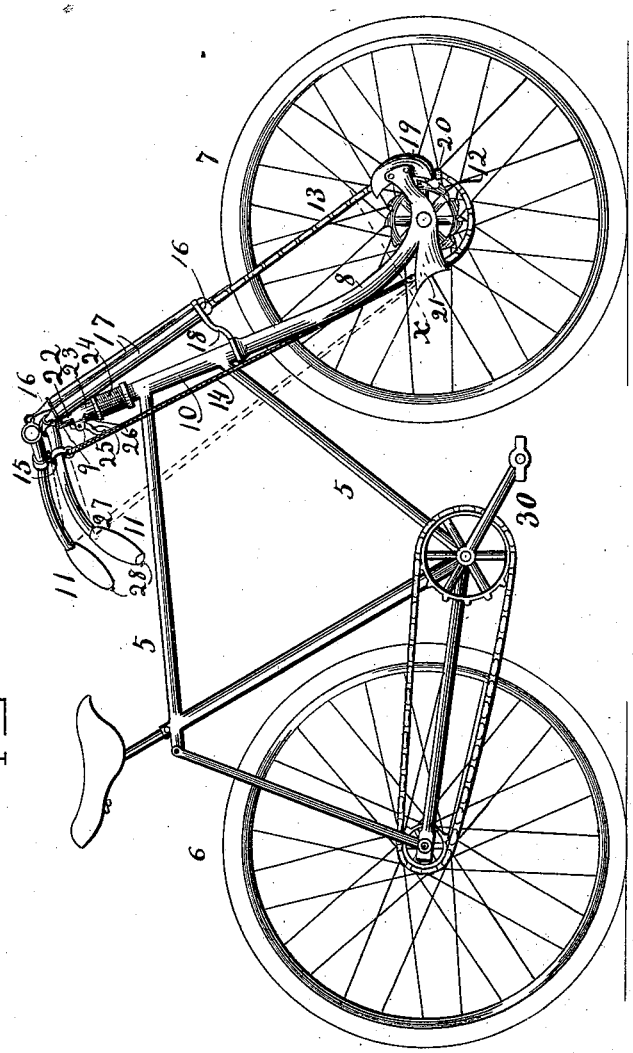

(No Model.)  
2 Sheets—Sheet 1.

E. D. WILLIAMS.
BICYCLE.

No. 534,537.  
Patented Feb. 19, 1895.

WITNESSES,  
P. E. Stevens.  
Emma G. Brashears

INVENTOR.  
Elbert D. Williams.  
by W. X. Stevens. ATT'Y.

(No Model.)
E. D. WILLIAMS.
BICYCLE.
No. 534,537.
2 Sheets—Sheet 2.
Patented Feb. 19, 1895.
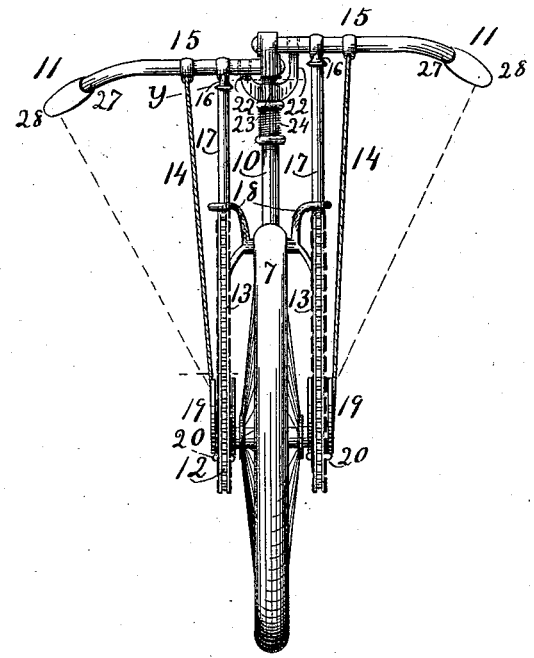
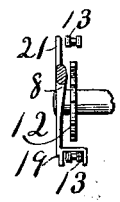
Witnesses,
P. E. Stevens.
Emma G. Brashears.
Inventor.
Elbert D. Williams.
by W. K. Stevens Atty.

UNITED STATES PATENT OFFICE.

ELBERT D. WILLIAMS, OF COLORADO, TEXAS.

BICYCLE.

SPECIFICATION forming part of Letters Patent No. 534,537, dated February 19, 1895.

Application filed November 2, 1894. Serial No. 527,721. (No model.)

*To all whom it may concern:*

Be it known that I, ELBERT D. WILLIAMS, a citizen of the United States, residing at Colorado, in the county of Mitchell and State of Texas, have invented a new and useful Improvement in Bicycles; and I do hereby declare the following to be a full, clear, and exact description of the same, reference being had to the accompanying drawings, in which—

Figure I, is a side elevation of a bicycle according to my invention and Fig. II, is a front view of the same. Fig. III, is a top view partly in horizontal section at the line $x$ and Fig. IV, is a horizontal section at the line $y$ of Fig. II.

5 represents the frame of the machine mounted in any usual manner upon a rear wheel 6 and a forward wheel 7.

8 represents the forward fork in which the wheel 7 is journaled and which may be connected with the frame 5 to turn nearly horizontally therein in any usual manner, such for example as by a spindle 9 of the fork passing up through a sleeve 10 of the frame.

11 represents the handles, each journaled independently of the other in the head of the spindle 9, and each bent backward at its outer end, forming a lever to rock in the said bearing.

12 represents two ratchet wheels secured rigidly upon the ends of the hub of the forward wheel 7.

13 represents two chains connected respectively with the handles 11, by means of cords 14, and bands 15, and connected at the other end with the handle bars by means of a spring or elastic 16. Each of these springs I have here shown as incased in a tube 17 which is supported at its lower end on a bracket 18 that is fixed to the forward fork 8.

19 represents guideways made as a portion of or fixed to the respective sides of the fork 8, and adapted to direct the chain 13 to slide freely therein over the forward part of the ratchet wheel. There is sufficient slack in the chain to permit its lower portion to hang free of the ratchet wheel when a knob 20 on the chain rests against the under side of the guideway 19.

21 is an outside guard for each chain and made as a part of and fixed to each side of the fork 8.

22 represents two bolts adapted to slide endwise into or through holes in the bars of the handles 11, and these bolts are provided with a sleeve 23 which is fitted to slide upon the spindle 9.

24 is a spring acting against the sleeve to push the bolts 22 into engagement with the handle bars.

25 is a thumb latch pivoted in the sleeve 23 and adapted to swing into a notch 26 in the spindle to hold the sleeve down against the action of the spring 24 to keep the bolts 22 out of engagement whenever it is desired to work the handles 11 as propelling levers.

The cords or chains 14 when in service are to be caught upon the handles either at 27 or 28 according as power or speed is required. When the handles 11 are to be used as a guide bar only, the cords will be left hanging direct from the bands 15.

By pressing upon the latch 25 to disengage it from the spindle 9 the sleeve 23 will be set free, with its bolts 22 to be impelled by the spring 24 into engagement with the handle-bars 11, when they are turned into their normal position as steering handles.

The operation of my propelling mechanism is as follows: First, the sleeve 23 should be pushed down until the latch 25 locks it with the bolts 22 out of engagement, leaving the levers 11 free. Now the cords 14 may be connected with the levers either at 27 or 28. Then by pulling and pushing on the levers either alternately or together as may suit the operator best, the result will be that at each pull the lower slack portion of the chain will be drawn up into engagement with the ratchet wheel and the wheel will thereby be revolved. Then when the lever is pushed forward the slanting forward sides of the ratchet teeth will throw the chain out of engagement and it will be drawn forward and upward by the spring or elastic 16, the guideway 19 keeping that portion of the chain which would naturally be pulled into engagement with the ratchet wheel, free therefrom. The guard 21 keeps the chain at its rear end from being swung out of line of the ratchet wheel. The operation is a reciprocating motion which may be repeated rapidly or at intervals to suit the operator, and in case of deep sand or a steep hill to be ascended the operator may use both hands at once with short kedging movements to force the machine past the obstacle. If both handles be pulled upon to operate the chains at a slower rate of speed than the ratchet is traveling the chain will operate as a brake upon the wheel, but the instant the handles are pushed forward the chain is disengaged from the ratchet and the wheel is left unimpeded for coasting. The kind of chain used, and the connections 14, whether they be rods, chains, wires or cords do not affect my invention; and the locking bolts 22 might in some instances be left out without interfering with the principal characteristic of my invention.

Some of the advantages of this invention are as follows: First, while it does not in any respect interfere with the usual foot propelling mechanism 30, it may at any time be operated in connection therewith both for the better exercise of the arms and the upper portion of the operator's body in general service and for more advantageously utilizing the operator's full strength in surmounting obstacles. The full advantage of this propelling device may be obtained while the operator sits in the normal healthy upright position. It does not materially increase the weight or cost of the bicycle, and it adds greatly to the power applied and speed to be attained. It is evident that each chain, ratchet wheel and lever makes a complete driving device independent of the other and as whatever is claimed of one covers more than one so for simplicity of expression the claim for both will be made as for one.

Having thus fully described my invention, what I claim, and desire to secure by Letters Patent, is—

1. The combination in a bicycle of a drive wheel; a ratchet wheel rigidly fixed to the drive wheel; a chain hung in a loop around the ratchet wheel; means for reciprocating the chain, and a guideway between the chain and ratchet wheel and partly above the said wheel, whereby the chain is prevented from gravitating into engagement with the wheel.

2. The combination of a bicycle drive wheel; a ratchet wheel fixed thereto; a chain hung in a loop around the ratchet wheel; a guideway between the chain and ratchet wheel and partly above the latter; means for reciprocating the chain, and a knob upon the chain adapted to engage the guideway substantially as described whereby the chain in its return movement will be stopped and be permitted to fall free of the ratchet when strain upon the forward end of the chain is relaxed.

3. The combination of a bicycle drive wheel; a ratchet wheel rigidly secured thereto; a chain hung to engage the ratchet in its forward movement and to be disengaged therefrom in its return movement; a spring for retracting the chain, a lever for advancing the chain, a cord or similar flexible connection between the chain and the lever, and one or more attaching hooks on the lever at different distances from its axis, over which the said cord may be looped substantially as described, whereby the chain when connected to the nearest point of the lever will be left loose to gravitate away from the ratchet but when the cord is looped up the chain will be held in contact with the ratchet to engage the teeth in the forward movement and to slide over the teeth in its return movement.

4. The combination of a bicycle drive wheel hung in a steering fork; a pair of ratchets upon the said wheel; a pair of chains hung to engage the ratchets and a pair of levers connected with the chains; the said levers being journaled independently of each other in the steering fork, the two journals crossing the head of the steering fork in different planes substantially as described, whereby each lever is firmly connected with the steering fork and yet the structure is made light.

In testimony whereof I affix my signature in presence of two witnesses.

ELBERT D. WILLIAMS.

Witnesses:
G. H. COLVIN,
C. C. BLANDFORD.